US009994082B2

(12) United States Patent
Seboe et al.

(10) Patent No.: US 9,994,082 B2
(45) Date of Patent: Jun. 12, 2018

(54) TIRE MONITORING BASED ON INDUCTIVE SENSING

(71) Applicant: TEXAS INSTRUMENTS INCORPORATED, Dallas, TX (US)

(72) Inventors: Thomas Christian Seboe, Mountain View, CA (US); Vlad Tiberiu Craciunescu, Regensburg (DE)

(73) Assignee: Texas Instruments Deutschland, GMBH, Freising (DE)

( * ) Notice: Subject to any disclaimer, the term of this patent is extended or adjusted under 35 U.S.C. 154(b) by 98 days.

(21) Appl. No.: 15/224,658

(22) Filed: Jul. 31, 2016

(65) Prior Publication Data
US 2017/0028798 A1 Feb. 2, 2017

Related U.S. Application Data (60) Provisional application No. 62/199,959, filed on Jul. 31, 2015.

(51) Int. Cl.
*B60C 23/02* (2006.01)
*B60C 23/06* (2006.01)
(Continued)

(52) U.S. Cl.
CPC ........ *B60C 23/064* (2013.01); *B29D 30/0061* (2013.01); *B29D 2030/0083* (2013.01); *B60C 2019/004* (2013.01)

(58) Field of Classification Search
None
See application file for complete search history.

(56) References Cited

U.S. PATENT DOCUMENTS 4,074,227 A * 2/1978 Kalmus ............... B60C 23/0493
340/447
4,103,283 A * 7/1978 Lee ..................... B60C 23/0428
200/61.25
(Continued)

FOREIGN PATENT DOCUMENTS

RU          2425760 C1    8/2011
WO       2002020287 A1    3/2002
WO       2007006871 A1    1/2007

OTHER PUBLICATIONS

PCT Search Report for Application No. PCT/US2016/045059, dated Dec. 8, 2016.

*Primary Examiner* — Andre Allen
(74) *Attorney, Agent, or Firm* — Andrew Viger; Charles A. Brill; Frank D. Cimino (57) ABSTRACT

A vehicle tire monitoring methodology is based on embedding into a tire at least one tire inductor coil with multiple circumferential windings. A tire condition that causes deformation of the tire, causes deformation of the tire inductor coil. A tire condition (such as pressure, speed, damage or deterioration) can be monitored by acquiring tire coil response measurements corresponding to an inductive response to the tire condition that causes deformation of the tire, and thereby deformation of the tire inductor coil, and then converting the tire coil response into data representing the tire condition. Multiple circumferential tire inductor coils can be embedded (such as into the tread and/or sidewalls), so that tire monitoring can involve acquiring respective tire coil responses corresponding to a tire condition that causes differential tire coil responses (such as steering direction), which can be converted into data representing the tire condition.

14 Claims, 5 Drawing Sheets

(51) Int. Cl.
*B29D 30/00* (2006.01)
*B60C 19/00* (2006.01)

(56) References Cited

U.S. PATENT DOCUMENTS

| | | | | |
|---|---|---|---|---|
| 4,409,586 | A * | 10/1983 | Hochstein | B60C 23/0428 340/448 |
| 2005/0000278 | A1* | 1/2005 | Haralampu | B60C 23/0425 73/146 |
| 2007/0085668 | A1* | 4/2007 | Katou | B60C 23/0433 340/447 |
| 2010/0147063 | A1* | 6/2010 | Suzuki | B60C 23/0408 73/146.5 |
| 2010/0288411 | A1* | 11/2010 | Loewe | B60C 23/004 152/419 |
| 2016/0176249 | A1* | 6/2016 | Brushaber | B60C 23/003 73/146 |

\* cited by examiner

TIRE MONITORING BASED ON INDUCTIVE SENSING

CROSS-REFERENCE TO RELATED APPLICATIONS

Priority is claimed under 37 CFR 1.78 and 35 USC 119(e) to U.S. Provisional Application 62/199959, filed 31 Jul. 2015, which is incorporated by reference.

BACKGROUND

Technical Field

This Provisional Patent Disclosure relates to vehicle tire condition monitoring, such as tire pressure.

Related Art

Tire pressure monitoring systems (TPMS) are used to monitor air pressure inside pneumatic tires on various types of vehicles. TPMS report real-time tire-pressure information, for example via a gauge, a pictogram display, or a low-pressure warning light. TPMS can be either direct or indirect. Direct TPMS uses tire pressure sensors, either internal or external. A internal sensor can be mounted on a tire rim inside a mounted tire. Some TPMS systems also monitor tire temperature.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for tire monitoring based on inductive sensing using embedded circumferential tire inductor coils, such as can be used in automotive tire monitoring applications.

According to aspects of the Disclosure, a vehicle tire monitoring methodology includes: (a) embedding into the tire at least one tire inductor coil with multiple circumferential windings, such that deformation of the tire causes deformation of the at least one tire inductor coil; and (b) monitoring the tire by acquiring from the tire inductor coil, coil response measurements, and converting the coil response measurements into data representing the tire condition (such as pressure, speed, damage or deterioration). The tire coil response measurements correspond to an inductive response of the tire inductor coil to a tire condition that causes deformation of the tire, and thereby deformation of the tire inductor coil.

In other aspects of the Disclosure, multiple circumferential tire inductor coils can be embedded, so that tire monitoring can involve acquiring respective tire coil responses corresponding to a tire condition that causes differential tire coil responses (such as steering direction), which can be converted into data representing the tire condition. For example, at least two tire inductor coils are embedded into respective sides of a tire tread, and at least two tire inductor coils are embedded into respective tire sidewalls.

In other aspects of the Disclosure, tire monitoring can be accomplished by disposing a sense coil proximate to the at least one tire inductor coil, and at least periodically magnetically coupling the sense coil to the at least one tire inductor coil in a transformer configuration, to acquire the tire coil response measurements representing the tire condition.

Other aspects and features of the invention claimed in this Patent Document will be apparent to those skilled in the art from the following Disclosure.

BRIEF DESCRIPTION OF THE DRAWINGS

FIGS. 5A-5C illustrate an example application for a tire monitoring system based on inductive sensing according to this Disclosure, for damage detection: FIG. 5A functionally illustrates for a tire [50] potential areas [51] for detecting tire damage that will cause coil displacement, and therefore a change in tire coil response signal (such as coil inductance measurement from the tire inductor coil)

FIGS. 6A-6C illustrate an example application for a tire monitoring system based on inductive sensing according to this Disclosure, for steering direction detection: FIG. 6A functionally illustrates for a tire [60] a change in tire pressure [61] caused by tire steering that will cause tire inductor coil deformation, and therefore a change in tire coil response signal (such as coil inductance measurement)

DETAILED DESCRIPTION

This Description and the Drawings constitute a Disclosure for vehicle tire monitoring based on inductive sensing with embedded circumferential tire inductor coils, including describing example embodiments, and illustrating various technical features and advantages.

In brief overview, vehicle tire inductive monitoring is based on embedding into a tire at least one tire inductor coil with multiple circumferential windings. A tire condition that causes deformation of the tire (such as pressure, speed, damage or deterioration), also causes deformation of the tire inductor coil. A tire condition can be monitored by acquiring tire coil response measurements corresponding to an inductive response to the tire condition that causes deformation of the tire, and thereby deformation of the tire inductor coil, and then converting the tire coil response into data representing the tire condition. Multiple circumferential tire inductor coils can be embedded (such as into the tread and/or sidewalls), so that tire monitoring can involve acquiring respective tire coil responses corresponding to a tire condition that causes differential tire coil responses (such as steering direction), which can be converted into data representing the tire condition.

As used in this Disclosure and the Claims, the terms "tire tread" and "tire sidewall" are used to designate the tire tread area and the tire sidewall area, and not specific plies, belts, liners or other parts of the tire, unless context or reference numeral is used to designate a specific tire part.

A tire monitoring system based on inductive sensing with embedded circumferential tire inductor coil(s) according to this Disclosure can be configured to monitor/measure tire condition based on deformation of a vehicle tire. Tire deformation causes corresponding deformation of the embedded tire inductor coil(s), which can be inductively measured as a change in tire inductor coil response, such as a measured change in inductance. Example applications include tire pressure, speed and steering direction. Another example application includes detecting damage that can compromise the structural integrity of tires in multiple areas (such as tread and/or sidewall).

Multiple circumferential tire inductor coils can be embedded, so that tire monitoring can involve acquiring respective tire coil responses corresponding to a tire condition that causes differential tire coil responses (such as steering direction), which can be converted into data representing the tire condition. For example, at least two tire inductor coils are embedded into respective sides of a tire tread, and at least two tire inductor coils are embedded into respective tire sidewalls.

For example, tire monitoring can be accomplished by disposing a sense coil proximate to the at least one tire inductor coil (for example embedded in the tire or mounted to the wheel). At least periodically, the sense coil is magnetically coupled to the at least one tire inductor coil in a transformer configuration (such as through periodic sense coil excitation signals), to acquire the tire coil response measurements representing the tire condition.

Figure 1:
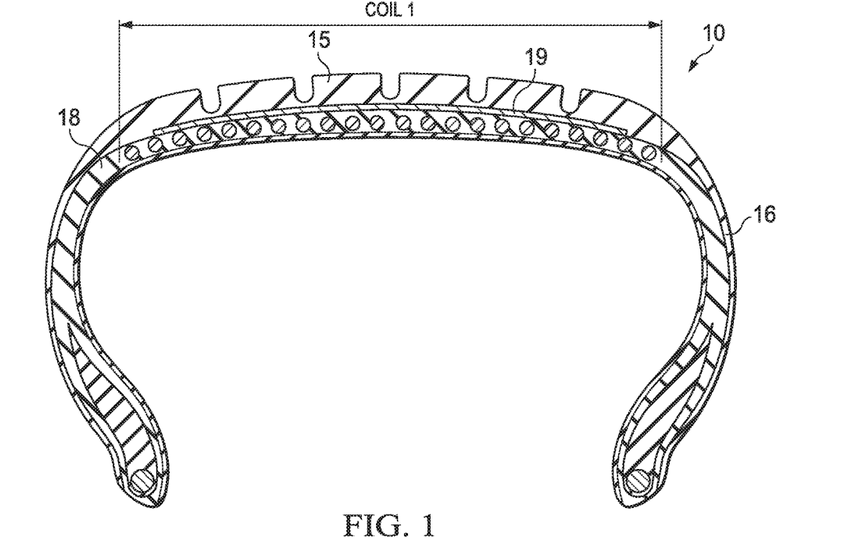
FIG. 1 illustrates an example embodiment of a tire [10] constructed for use in a tire monitoring system based on inductive sensing according to this Disclosure, with a single coil setup in which a single tire inductor coil [Coil 1], with multiple circumferential windings, is circumferentially embedded in the tire tread (area) [15, 18].
Figure 2:
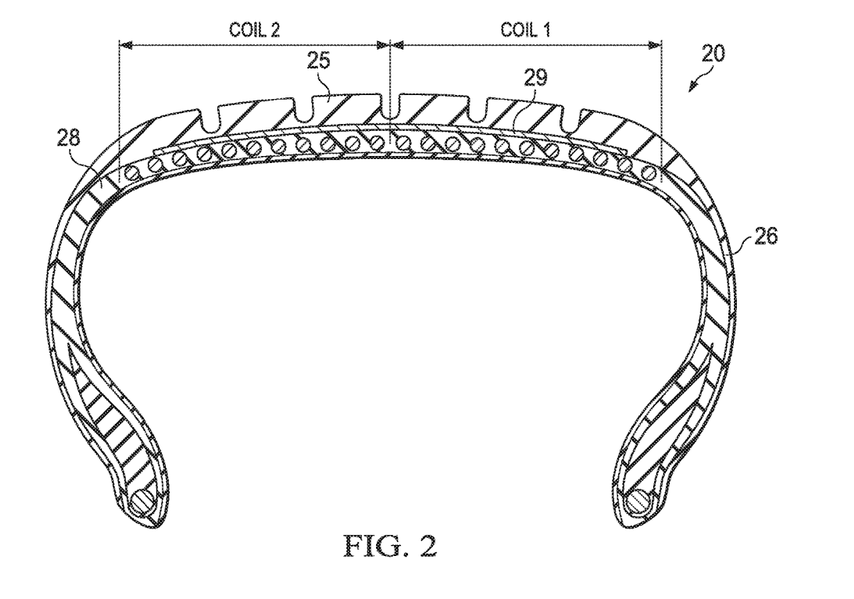
FIG. 2 illustrates an example embodiment of a tire [20] constructed for use in a tire monitoring system based on inductive sensing according to this Disclosure, with a two coil setup in which two tire inductor coils [Coils 1-2], each with multiple circumferential windings, are circumferentially embedded in respective sides of the tire tread [25, 28].
Figure 3:
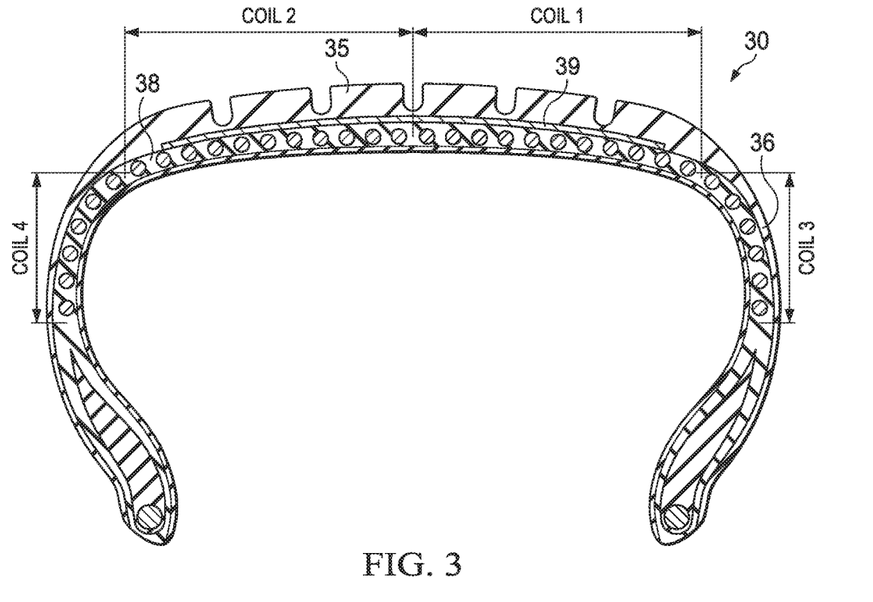
FIG. 3 illustrates an example embodiment of a tire [30] constructed for use in a vehicle tire monitoring system based on inductive sensing according to this Disclosure, with a four coil setup in which four circumferential tire inductor coils [Coils 1-4], each with multiple circumferential windings, are circumferentially embedded in the tire [30], with two coils [Coils 1-2] embedded in respective sides of the tire tread [35, 38], and two coils [Coils 3-4] embedded in the tire along respective tire sidewalls [36, 38].

FIGS. 1-3 illustrate example embodiments of vehicle tire monitoring based on inductive sensing with embedded circumferential tire inductor coil(s) according to this Disclosure. FIG. 1 illustrates an example implementation using one tire inductor coil embedded under the tire tread. FIGS. 2 and 3 illustrate example implementations with multiple embedded tire inductor coils in order to better localize a tire damage condition, and to enable additional tire condition monitoring (such as by differential measurement): FIG. 2 illustrates an example two coil implementation with two tire inductor coils embedded under the tire tread; and FIG. 3 illustrates an example four coil implementation with two tire inductor coils embedded under the tire tread and two tire coils embedded at respective tire sidewalls.

FIG. 1 illustrates an example embodiment of a tire 10 constructed for use in a vehicle tire monitoring system based on inductive sensing according to this Disclosure. A single coil setup includes a single tire Coil 1, with multiple windings circumferentially embedded into tire 10 beneath tire tread 15. For example, as illustrated, tire Coil 1 is embedded in a tire ply area 18, beneath a steel belt 99 that underlies tire tread 15.

FIG. 2 illustrates an example embodiment of a tire 20 constructed for use in a vehicle tire monitoring system according to this Disclosure, with a two coil setup in which two tire Coils 1-2, each with multiple circumferential windings, are embedded in respective sides of tire 20 beneath tread 25. For example, as illustrated, the two tire Coils 1-2 are embedded in a tire ply area 28, beneath a steel belt 29 that underlies tire tread 25.

FIG. 3 illustrates an example embodiment of a tire 30 constructed for use with a vehicle tire monitoring system based on inductive sensing according to this Disclosure, with a four coil setup in which four circumferential tire Coils 1-4, each with multiple circumferential windings, are embedded in tire 30. For example, as illustrated, two tire Coils 1-2 are embedded in a tire ply area 38, beneath a steel belt 39 that underlies tire tread 25, and two tire Coils 3-4 are embedded in the tire ply area 38 along respective tire sidewalls 36.

Figure 4:
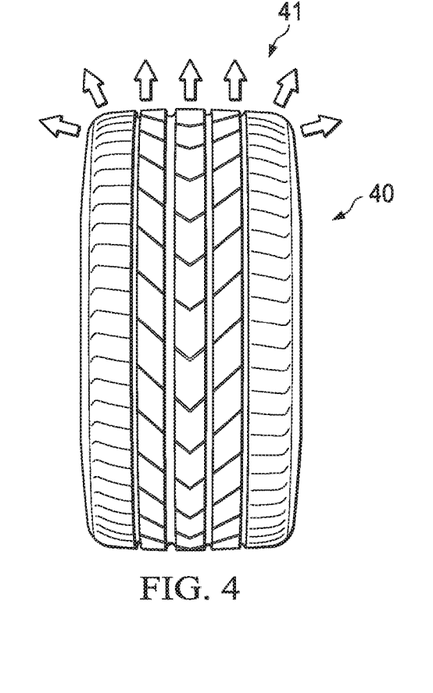
FIG. 4 functionally illustrates for a tire [40] the expansion [41] of the tire (tread and sidewalls) due to increased tire pressure, and/or due to increased wheel speed, expansions that will cause a coil displacement, and therefore a change in sensor signal (tire sense coil measurement).
Figure 5A:
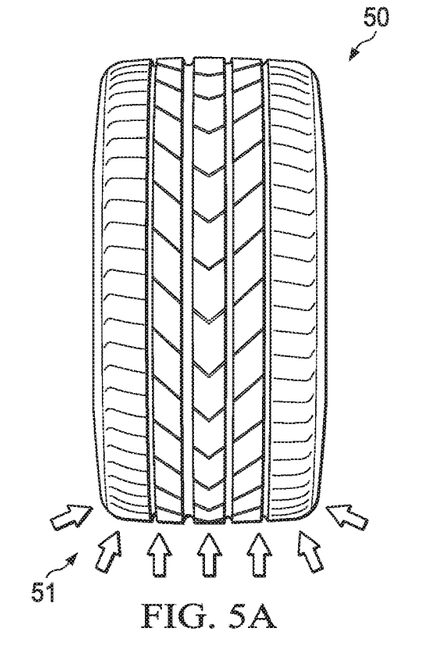
Figure 6A:
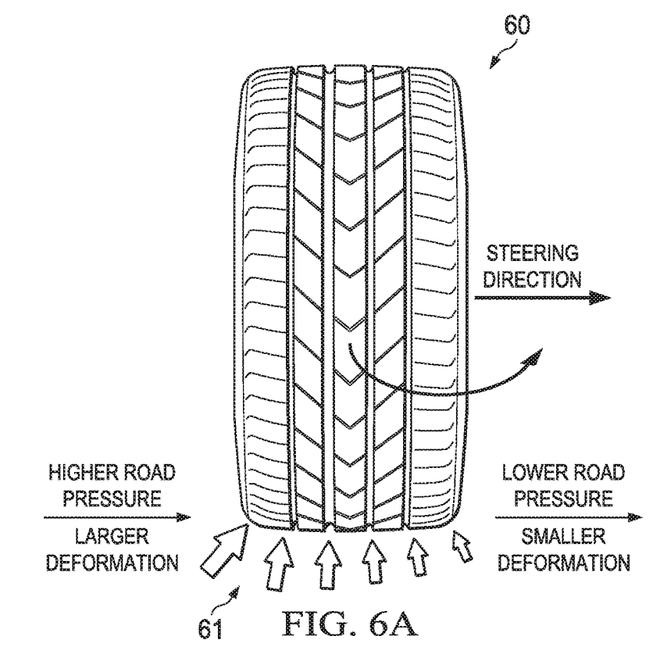

FIGS. 4, 5A, 6A illustrate example tire conditions that can be monitored by vehicle tire monitoring based on inductive sensing with embedded circumferential tire inductor coil(s) according to this Disclosure: FIG. 4 illustrates expansion of the tire (tread and sidewalls) due to increased tire pressure, and/or due to increased wheel speed; FIG. 5A illustrates potential areas for detecting tire damage; and FIG. 6A illustrates a change in tire pressure caused by tire steering. Each of these tire conditions will cause tire deformation, which will cause corresponding deformation of the embedded tire inductor coil(s), and which can be inductively measured as a change in tire coil response, such as a measured change in inductance.

FIG. 4 functionally illustrates tire expansion caused by tire pressure as a tire condition that can be monitored by vehicle tire monitoring system based on inductive sensing according to this Disclosure. For a tire 40, constructed with one or more embedded circumferential tire inductor coils according to this Disclosure, the expansion 41 of the tire (tread and sidewalls) due to increased tire pressure, and/or due to increased wheel speed will cause a tire inductor coil deformation (FIGS. 1-3, Coils 1-4), and therefore a change in tire coil response signal (such as a measured change in inductance).

That is, centrifugal forces on the tire depend on the driving speed. With increasing speed the tread of the tire is expands (deforms), which means that the tire inductor coil will deform (expand), causing a change in inductance that can be measured. This effect will move the overall baseline of the tire coil response signal(s), from which, for example, speed information can be derived.

Figure 5B:
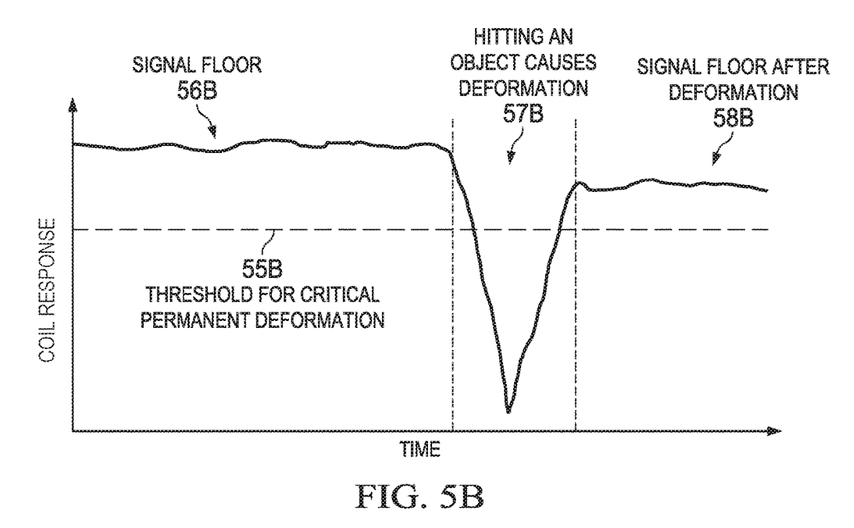
FIGS. 5B-5C illustrate example plots of tire coil response, with a threshold for critical permanent deformation [55B/55C], and tire coil responses from a tire inductor coil for an initial signal floor [56B/56C], a tire impact deformation 57B/57C] and a resulting post-impact deformation (representing a new signal floor) indicating that the tire remains functional [58B], or that the tire is damaged [58C].
Figure 5C:
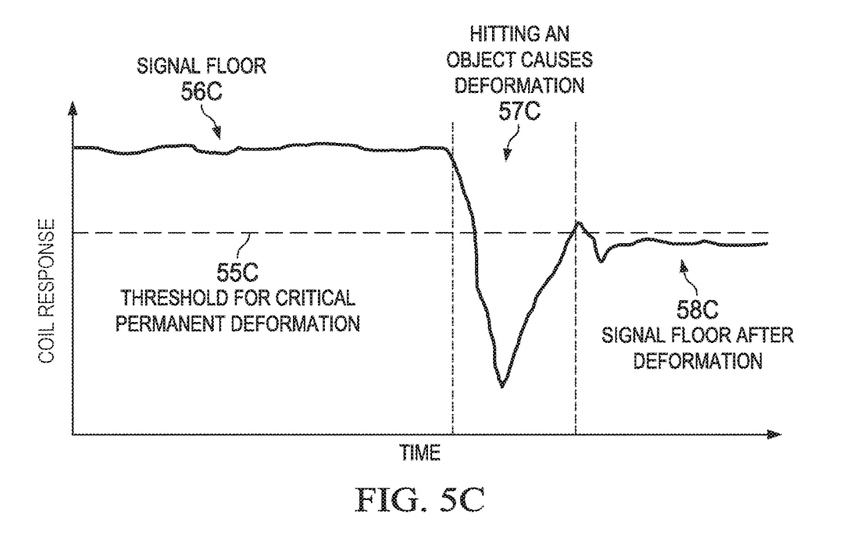

FIGS. 5A-5C illustrate an example application for a tire monitoring system based on inductive sensing according to this Disclosure, such as for damage/deterioration monitoring/detection.

FIG. 5A illustrates a tire 50, including functionally illustrating potential areas for detecting tire damage at the tire tread and sidewalls due, such as due to impact or deterioration.

FIGS. 5B-5C illustrate example plots of tire inductor coil response (such as a measured change in inductance) to tire impact that deforms tire 50. A threshold for critical permanent deformation 55B/55C can be defined, and a tire inductor coil response signal floor [56B/56C] is established. A tire inductor coil response from a tire impact deformation is illustrated at 57B/57C. That is, tire inductor coil response corresponds to measurement output signal from one or more tire inductor coils, for example, representing a change in coil inductance, and therefore provides an indication of impact (or deterioration), including impact (or deterioration) detected as tire damage/failure.

Referring to FIG. 5B, after tire impact deformation 56B, tire inductor coil response transitions from a tire impact condition 57B, to a post-impact tire condition as represented by a post impact sensor signal floor 58B. In this case, post-impact deformation as represented by sensor signal 58B indicates that the tire remains functional, with the post-impact sensor signal floor 58B above the defined threshold for critical permanent deformation 55B.

Referring to FIG. 5C, after tire impact deformation 56C, tire inductor coil response transitions from a tire impact condition 57C, to a post-impact tire condition as represented by a post impact sensor signal floor 58C. In this case, post-impact deformation as represented by sensor signal 58C indicates a tire condition corresponding to critical permanent deformation/damage, with the post-impact sensor signal floor 58C below the defined threshold for critical permanent deformation 55C.

That is, the tire coil response signal floor (baseline) pre-impact 56B/56C and post-impact 58B/58C describes the standard signal (including variation of inductance) while driving. An event, such as tire deformation from hitting an object (such as a pothole), causes a significant change in sensor signal 57B/57C, followed either by: (FIG. 5B), a post-impact tire coil response baseline 58B corresponding to a tire recovery condition (relative to the tire structural integrity threshold 55B) in which structural integrity of the tire has not been compromised, or (FIG. 5C) a post-impact tire coil response baseline 58C corresponding to a tire recovery condition (relative to tire structural integrity threshold 55C) in which permanent deformation indicates that the structural integrity of the tire has been compromised.

Note that a critical deformation condition can also occur due to a tire defect or deterioration, as indicated by the tire coil response signal floor baseline transitioning to a level below the threshold for critical permanent deformation 55B/55C, but not due to tire impact. Note also that the tire coil response baseline can be determined using the signals of multiple tire coils embedded in a tire wheel, and of multiple tires/wheels.

Figure 6B:
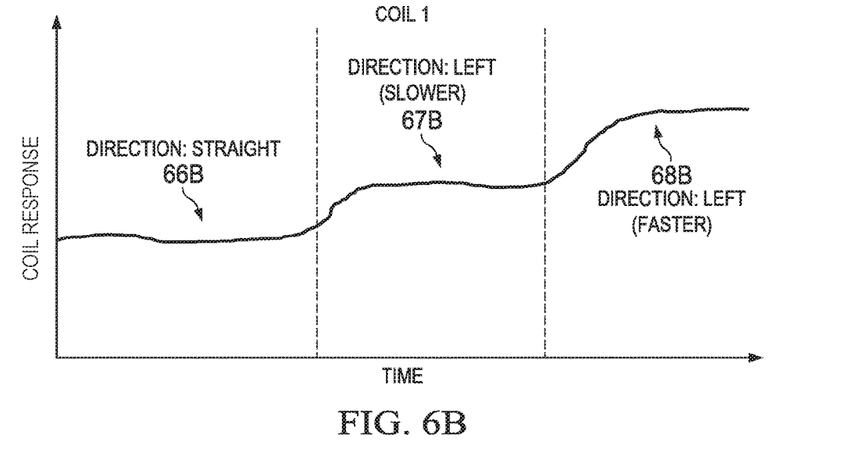
FIGS. 6B-6C illustrate example plots of tire coil response for differential coils [Coils 1-2], including direction:straight [66B/66C], direction:left (slower) [67B/67C] and direction: left (faster) [68B/68C].
Figure 6C:
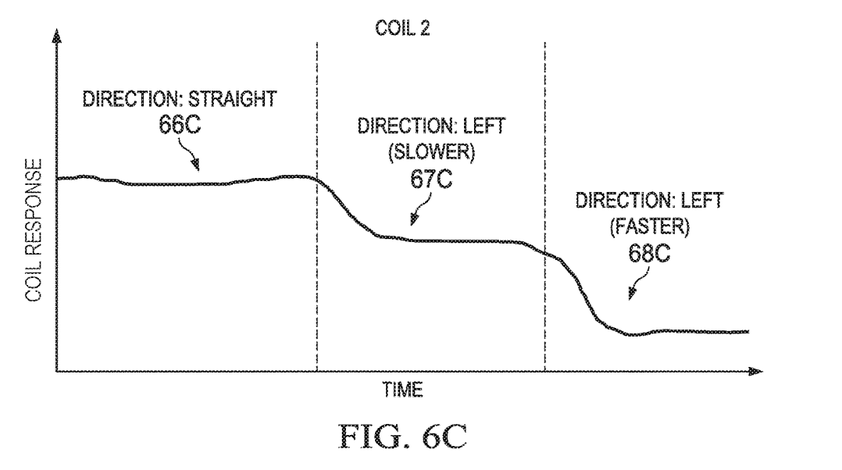

FIGS. 6A-6C illustrate an example application for a tire monitoring system based on inductive sensing according to this Disclosure, such as for steering direction detection.

FIG. 6A illustrates a tire 60, including functionally illustrating a change in tire pressure distribution caused by tire steering.

FIGS. 6B-6C illustrate example plots of tire coil response (such as a measured change in inductance) for differential tire Coils 1-2 (FIGS. 2 and 3). In this case, the tire coil response signal baseline is a tire condition representing direction:straight 66B/66C. A change in tire steering direction (left) is represented by a transition in tire coil response signal from the baseline tire condition direction:straight 66B/66C, to a tire condition direction:left (slower) 67B/67C, and then tire condition direction:left (faster) 68B/68C. Tire coil response corresponds to measurement output signal from differential tire Coils 1-2, for example, representing a change of the tire coil's inductance, and therefore provides an indication of steering direction (including speed).

That is, using a minimum of two coils, as illustrated in FIGS. 2 and 3, steering direction can be determined (differentially). In case a vehicle is steering in a certain direction, the centrifugal force will affect the structure of the tire differently across the tread. Depending on the driving speed, the deformation will be higher or lower. In turn, tire deformation distribution across the tire correspondingly deforms the tire inductor coils. Hence, coil inductance changes accordingly, which can be measured, for example, to trigger a traction control response.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications, can be used by ordinarily skilled artisans as a basis for modifications, substitutions and alternatives to construct other embodiments, including adaptations for other applications.

The invention claimed is:

1. A method useable in a system for monitoring a vehicle tire, comprising:
   embedding into the tire at least one tire inductor coil with multiple circumferential windings, such that deformation of the tire causes deformation of the at least one tire inductor coil; and
   monitoring the tire by
      acquiring from the tire inductor coil, coil response measurements corresponding to an inductive response of the tire inductor coil to a tire condition that causes deformation of the tire, and thereby deformation of the tire inductor coil; and
      converting the coil response measurements into data representing the tire condition.

2. The method of claim 1, wherein monitoring the tire is accomplished by:
   disposing a sense coil proximate to the at least one tire inductor coil
   at least periodically magnetically coupling the sense coil to the at least one tire coil in a transformer configuration; and
   acquiring from the sense coil, tire coil response measurements representing the tire condition.

3. The method of claim 1, wherein the tire condition is one of pressure, speed, damage and deterioration.

4. The method of claim 1, wherein multiple circumferential tire inductor coils are embedded in the tire, each with multiple circumferential windings.

5. The method of claim 4, wherein monitoring the tire is accomplished by:
   acquiring respective coil response measurements from the multiple tire inductor coils corresponding to a tire condition that causes differential coil inductor responses from the multiple tire inductor coils; and
   converting the differential coil response measurements into data representing the tire condition.

6. The method of claim 4, wherein at least two tire inductor coils are embedded into respective sides of a tire tread, and at least two tire inductor coils are embedded into respective tire sidewalls.

7. The method of claim 4, wherein the tire condition is one of pressure, speed, direction, damage and deterioration.

8. A system for inductive vehicle tire monitoring, comprising:
- a tire mounted to a vehicle wheel; and
- at least one tire inductor coil with multiple circumferential windings embedded in the tire, such that deformation of the tire causes deformation of the at least one tire inductor coil;
- a tire monitoring inductive sensor to magnetically couple to the at least one tire inductor coil, to acquire coil response measurements corresponding to deformation of the at least one tire inductor coil as representing a tire condition, and to convert the coil response measurements into data representing the tire condition.

9. The system of claim 8, wherein the tire monitoring inductive sensor comprises:
- a sense coil operable to magnetically couple to the tire inductor coil, in a transformer configuration, and
- an inductance-to-data converter coupled to the at least one sense coil to provide periodic excitation signals, and to acquire from the tire inductor coil, the coil response measurements, and to convert the coil response measurements into data representing the tire condition.

10. The system of claim 8, wherein the tire condition is one of pressure, speed, damage and deterioration.

11. The system of claim 8, comprising multiple embedded circumferential tire inductor coils.

12. The system of claim 11, wherein the tire monitoring inductive sensor is operable to acquire respective coil response measurements from the multiple tire inductor coils corresponding to a tire condition that causes differential coil inductor responses from the multiple tire inductor coils; and to convert the differential coil response measurements into data representing the tire condition.

13. The system of claim 11, wherein at least two tire inductor coils are embedded in respective sides of a tire tread, and at least two tire inductor coils are embedded in respective tire sidewalls.

14. The system of claim 8, wherein the tire condition is one of pressure, speed, steering direction, damage and deterioration.

* * * * *